Patented Aug. 26, 1941

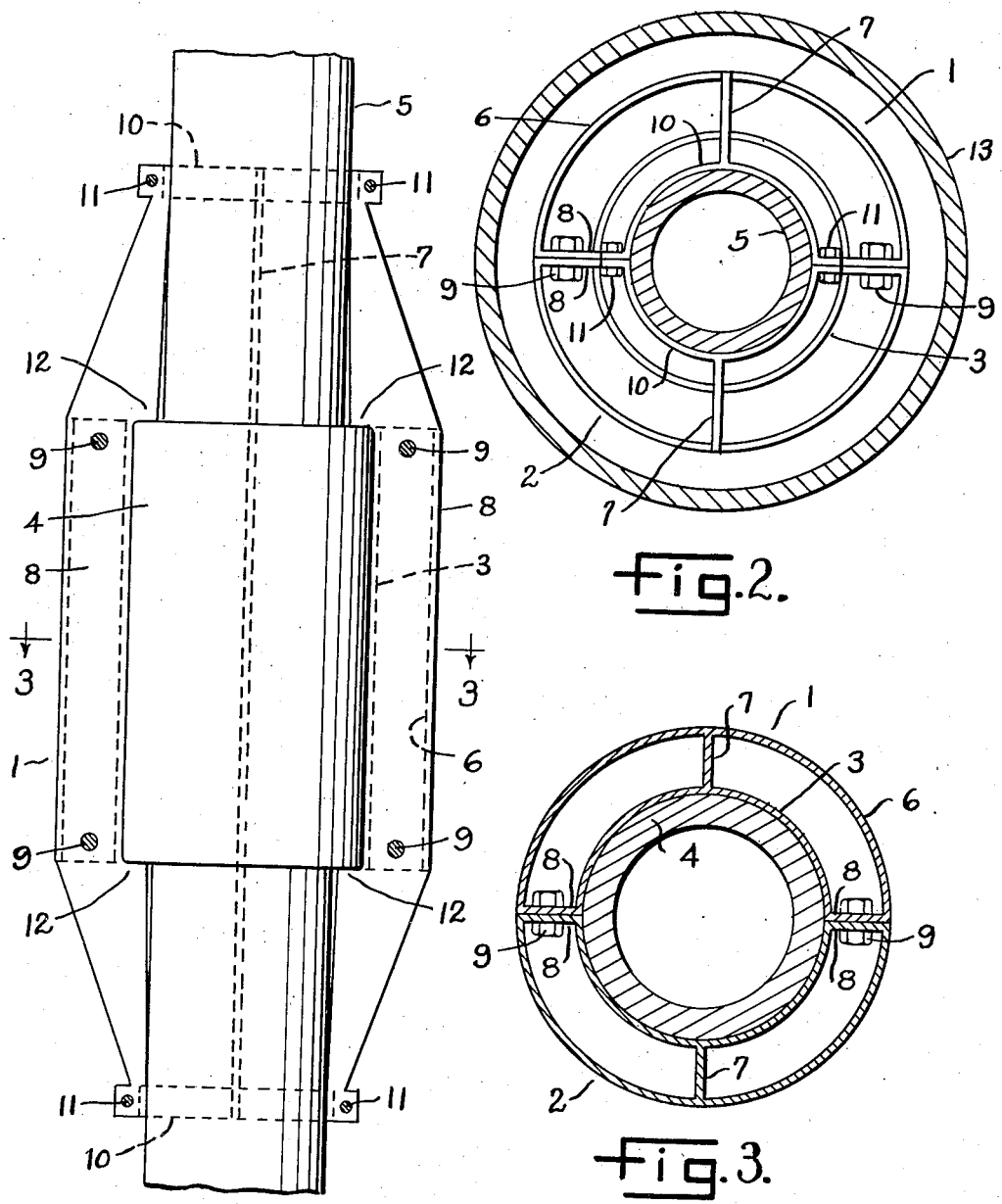

2,253,675

UNITED STATES PATENT OFFICE 2,253,675

CENTERING CAGE

Rousseau Arnold, Portland, Tex.

Application August 22, 1940, Serial No. 353,639

2 Claims. (Cl. 308—4)

This invention relates to a centering cage.

An object of the invention is to provide a cage adapted to be applied to a string of well tubing for holding the same spaced from the well casing so that in case the tubing becomes sanded up a milling tool may be run over the tubing, for the purpose of releasing the same, without damage to either the tubing or the casing.

Another object of the invention is to provide a centering cage that may be used in connection with jet collars, used in air or gas lift pumps, whereby said collars will be maintained in spaced relation with the casing so that their operation will not be interfered with and so that the casing will not be injured, or worn through, by a gritted fluid being jetted against the casing by the jet collars.

The centering cage may be also applied to reciprocating parts in the well such as pump rods to prevent the friction of said rods against the casing and the consequent wear on the rods.

With the above and other objects in view the invention has particular relation to certain novel features of construction, arrangement of parts and use, an example of which is given in this specification and illustrated in the accompanying drawing, wherein:

Figure 1 shows a fragmentary, elevational view of the tubing showing the connecting coupling and showing a half section of the cage as applied thereto.

Figure 2 shows an end view of the cage showing the well tubing and casing in section, and Figure 3 shows a cross sectional view taken on the line 3—3 of Figure 1.

Referring now more particularly to the drawing wherein like numerals of reference designate the same parts in each of the figures, the numerals 1 and 2 designate similar, complemental, sections of the cage. The two sections when secured together form an inner cylindrical sleeve 3, adapted to fit closely around the coupling 4 of the tubing 5, and the outer cylindrical jacket 6 which is spaced outwardly from the sleeve 3 and which is fixed in relation thereto by the oppositely disposed, radial webs 7, 7, extending longitudinally of the cage, and by the abutting, radial webs 8, 8 which are bolted together by the bolts 9, 9. The abutting webs 8, 8 are arranged in oppositely disposed pairs and extend longitudinally of the cage.

It will be noted from an inspection of Figure 1 that the sleeve 3 and the jacket 6 are approximately equal in length to the length of the collar 4 but the webs 7, 8 extend each way beyond said collar and their outer and inner margins taper. The extreme ends of the extensions terminate in the arcuate complemental sections 10, 10 which are secured together by the bolts 11, 11 forming the upper and lower clamp collars whereby the cage may be securely clamped, at its upper and lower ends, to the tubing.

It will be noted from an inspection of Figure 1 that the inner margins of the extensions of the webs 7, 8 diverge slightly from the tubing so that the clamp collars may be clamped tightly around the tubing.

It will be further noted that the end extensions of the webs 7, 8 are shouldered inwardly forming the upper and lower shoulders 12, 12 which engage the corresponding ends of the coupling 4 to firmly secure the cage to the tubing against longitudinal movement.

It will be further noted that the jacket 6 is of somewhat less outside diameter than the inside diameter of the casing 13 so that the cage will not bind against the casing when the tubing is being lowered into the well wherein the casing has bends or turns. The cage will therefore not interfere with the lowering or withdrawing of the tubing.

It often happens that, in a producing well, sand will congest between the lower end of the tubing and the casing. Without the centering cage the sanded up portion of the tubing might lie against the casing so that a tool such as an overshot milling tool could not be lowered over the tubing and the sand removed and the tubing released without injury to the tubing or the casing. If the tubing is equipped with the centering cage such as that above described a milling tool can be readily lowered over the tubing and operated to effect the release of the tubing without injury either to the tubing or the casing.

The cage may be clamped about the coupling or about the tubing proper as conditions may require. It should be formed of suitable material so that it can be readily cut away by a milling tool, in case of necessity, when installed on a tubing but should be made of material hard enough to withstand abrasive wear when applied to a sucker rod.

The cage may be readily applied to jet collars of pump equipment so as to hold them spaced away from the casing for the purposes hereinabove indicated or the cage may be applied to pump sucker rods, if desired, to prevent wear as a result of the friction between the rods and the casing.

It is obvious that as many cages may be applied to the tubing or to the sucker rods as the necessities of the case may require.

The drawing and description are illustrative merely while the broad principle of the invention will be defined by the appended claims.

What I claim is:

1. A centering cage formed of longitudinal complemental sections adapted to be fitted together around a coupling of a well tubing or the like, means for releasably securing said sections together, said cage comprising an inner tubular member shaped to closely surround the coupling and an outer tubular member, radial webs connecting said members in spaced relation and extending longitudinally of the coupling, said webs having end extensions whose free ends are clamped to the parts connected by the coupling by some of said securing means.

2. A centering cage shaped to be lowered into a well casing and to be fitted around a coupling connecting two parts, said cage comprising an inner tubular member shaped to closely surround said coupling and an outer tubular member, radial webs connecting said members in spaced relation and having upper and lower end extensions, said webs having inside stops engageable against the ends of the coupling and clamp means clamping said extensions about the parts connected by the coupling.

ROUSSEAU ARNOLD.